(12) United States Patent
Cretors

(10) Patent No.: US 8,828,468 B2
(45) Date of Patent: Sep. 9, 2014

(54) OSCILLATING HOT DOG GRILL

(71) Applicant: C. Cretors & Company, Chicago, IL (US)

(72) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 0 days.

(21) Appl. No.: 13/780,644

(22) Filed: Feb. 28, 2013

(65) Prior Publication Data

US 2013/0224359 A1    Aug. 29, 2013

Related U.S. Application Data

(60) Provisional application No. 61/604,320, filed on Feb. 28, 2012.

(51) Int. Cl.
*A47J 37/04*    (2006.01)

(52) U.S. Cl.
USPC ............................ 426/523; 99/423; 99/443 R

(58) Field of Classification Search
CPC .......... A23L 1/01; A47J 37/06; A47J 37/048; A47J 37/044
USPC ......... 426/523, 646; 99/422, 523, 443 R, 423
See application file for complete search history.

(56) References Cited

U.S. PATENT DOCUMENTS

| | | | |
|---|---|---|---|
| 1,904,198 A * | 4/1933 | Brand | 99/356 |
| 2,584,061 A * | 1/1952 | Stilphen | 99/422 |
| 2,631,525 A * | 3/1953 | Finizie | 99/423 |
| 2,697,395 A * | 12/1954 | Steriss | 99/423 |
| 2,825,192 A * | 3/1958 | Brodsky | 53/519 |
| 3,298,303 A * | 1/1967 | Waller | 99/423 |
| 4,055,677 A * | 10/1977 | White | 426/438 |
| 4,516,485 A | 5/1985 | Miller | |
| 4,522,117 A * | 6/1985 | Weimer et al. | 99/348 |
| 4,633,772 A * | 1/1987 | Bowden et al. | 99/332 |
| 4,704,956 A * | 11/1987 | Gill | 99/427 |
| 4,763,570 A * | 8/1988 | Bellanca | 99/348 |
| 4,982,657 A | 1/1991 | Ghenic | |
| 5,117,748 A | 6/1992 | Costa | |
| 5,533,440 A | 7/1996 | Sher | |

(Continued)

FOREIGN PATENT DOCUMENTS

WO    WO-9215183    9/1992

OTHER PUBLICATIONS

U.S. Appl. No. 12/650,181, filed Dec. 30, 2009, Cretors.

(Continued)

*Primary Examiner* — Drew Becker
(74) *Attorney, Agent, or Firm* — Perkins Coie LLP

(57) ABSTRACT

A hot dog grill for cooking hot dogs or similar food products is disclosed. The grill can include a plate having a heating surface. A grill assembly can be positioned proximate to the plate and can be moveable relative to the plate. A cam can be operably coupled to a motor and a first end portion of a connecting rod can be movably received within a groove in the cam. A second end portion of the connecting rod can be operably coupled to the grill assembly. Operation of the motor can rotate the cam and drive the connecting rod to move the grill assembly back and forth along the heating surface.

17 Claims, 12 Drawing Sheets

(56) References Cited

U.S. PATENT DOCUMENTS

| | | |
|---|---|---|
| 5,611,263 A | 3/1997 | Huang |
| 6,393,971 B1 | 5/2002 | Hunot et al. |
| 6,575,083 B2 | 6/2003 | Haas et al. |
| 6,800,314 B2 | 10/2004 | Evans et al. |
| 7,377,209 B2 * | 5/2008 | Perttola ............ 99/343 |
| 7,591,220 B2 | 9/2009 | Sheridan, Jr. |
| 7,658,143 B2 * | 2/2010 | Cretors ............ 99/331 |
| 8,148,669 B2 | 4/2012 | Schwierking et al. |
| 2010/0163548 A1 | 7/2010 | Cretors |

OTHER PUBLICATIONS

Gold Medal Products Co.; "Funfood Equipment & Supplies" catalog; vol. 56, dated 2000, 108 pages.

Proctor Companies; Equipment Catalog, 1992, 33 pages.

Proctor Companies; "Concession Stands and Equipment" catalog, vol. 3, 1996, 84 pages.

\* cited by examiner

OSCILLATING HOT DOG GRILL

CROSS-REFERENCE TO RELATED APPLICATION

The present application claims priority to and the benefit of U.S. Provisional Application No. 61/604,320, filed Feb. 28, 2012, and titled "OSCILLATING HOT DOG GRILL," the disclosure of which is incorporated herein by reference in its entirety.

TECHNICAL FIELD

This invention relates to machines for cooking hot dogs and more specifically, to a hot dog cooking device having an oscillating grill to move hot dogs on a cooking surface.

BACKGROUND

Known hot dog cookers use rotatable roller tubes for heating and cooking hot dogs and like foods. In the prior art, the roller tubes had been mounted to a housing by bearings. However, the load exerted by the tubes upon such bearings has caused deformation, and has caused wear and tear upon the bearing so that grease and other liquids can pass through the bearing seals and enter other parts of the housing such as the drive assembly.

Prior art roller tube heating assemblies have used drive systems that have employed a chain driven by a rotatable sprocket or gear. The chain has been connected to sprockets or gears mounted at the ends of the roller tubes so that rotation of the drive sprocket or drive gear rotates the roller tubes. In the prior art, the roller heating tubes have been mounted in a row horizontally relative to the housing, or in some cases, at an angle relative to the housing, with their central axes extending in a straight line. However, there have been problems caused by application of the drive chain force to a roller tube. This has resulted in distorting the end of the roller tube and the bearing to which the roller tube is mounted, allowing grease and liquids to pass by the bearing into enclosures such as into the area housing the drive components. Such a mechanism also involves relatively complex mechanical assemblies and larger numbers of parts.

Another method of cooking hot dogs involves use of a tilted grill which is moved back and forth over a heating surface on a box frame assembly. This arrangement results in a more uniform heat distribution to the hot dogs on the grill and removes the necessity for a separate drive mechanism for each roller. The oscillating motion of the grill rotates the hot dogs on the heating surface and allows for uniform cooking, thus eliminating the need for rotating individual rollers. The grill is typically mounted on a motorized cam which is attached to one side of the grill. A lateral linkage is attached to the cam and extends through the frame assembly to a similar can arrangement on the opposite side of the grill. This arrangement causes undue wear on the opposite side because the rod may come out of alignment causing the motor to be overworked and eventually fail.

Thus, there is a need for an oscillating hot dog grill which eliminates the need for a lateral linkage. There is a further need for a hot dog grill which provides a simple mechanism for moving a grill between two fixed points. There is yet another need for a simple heat control to maintain uniform heat to the hot dogs.

SUMMARY

These needs and others may be met by embodiments of the present invention, of which one example is a hot dog grill for cooking hot dogs or similar food products. The grill can have an inclined top plate having a defined heating surface. A grill assembly which has a top cross member and is in proximity to the heating surface and moveable between two positions relative to the top plate is provided. In several embodiments, a motor having a rotating shaft that extends from the inclined top plate is provided. The rotating shaft is mechanically coupled to the top cross member of the grill assembly. The motor propels the grill between the two positions relative to the inclined top plate. A heating element is provided under the heating surface.

Another example of an embodiment of the present invention is a hot dog grill for cooking hot dogs or similar food products having a frame assembly with a pair of side walls, a front wall and a back wall. An inclined top plate having a defined heating surface is mounted on the side walls and the front and back walls. A grill assembly having a pair of side bars and a top cross member joining the pair of side bars is provided. The grill assembly also including a plurality of lateral rods joining the pair of side bars and is placed on the defined heating surface. The grill assembly is moveable between two positions relative to the front and back walls. A motor is mounted under the top plate and has a rotating shaft extending from the inclined top plate. A pivot block has one end rotatably coupled to the rotating shaft and an opposite end coupled to a cap which is mechanically coupled to the top cross member of the grill assembly. The motor propels the cap in a circular motion and the cap moves the grill assembly between the two positions relative to the front and back walls. A heating element is provided under the heating surface.

The foregoing are only some embodiments of the invention described herein. Other embodiments include other structures and functions for moving hot dogs across a heated surface. Accordingly, it is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DETAILED DESCRIPTION

Figure 1:
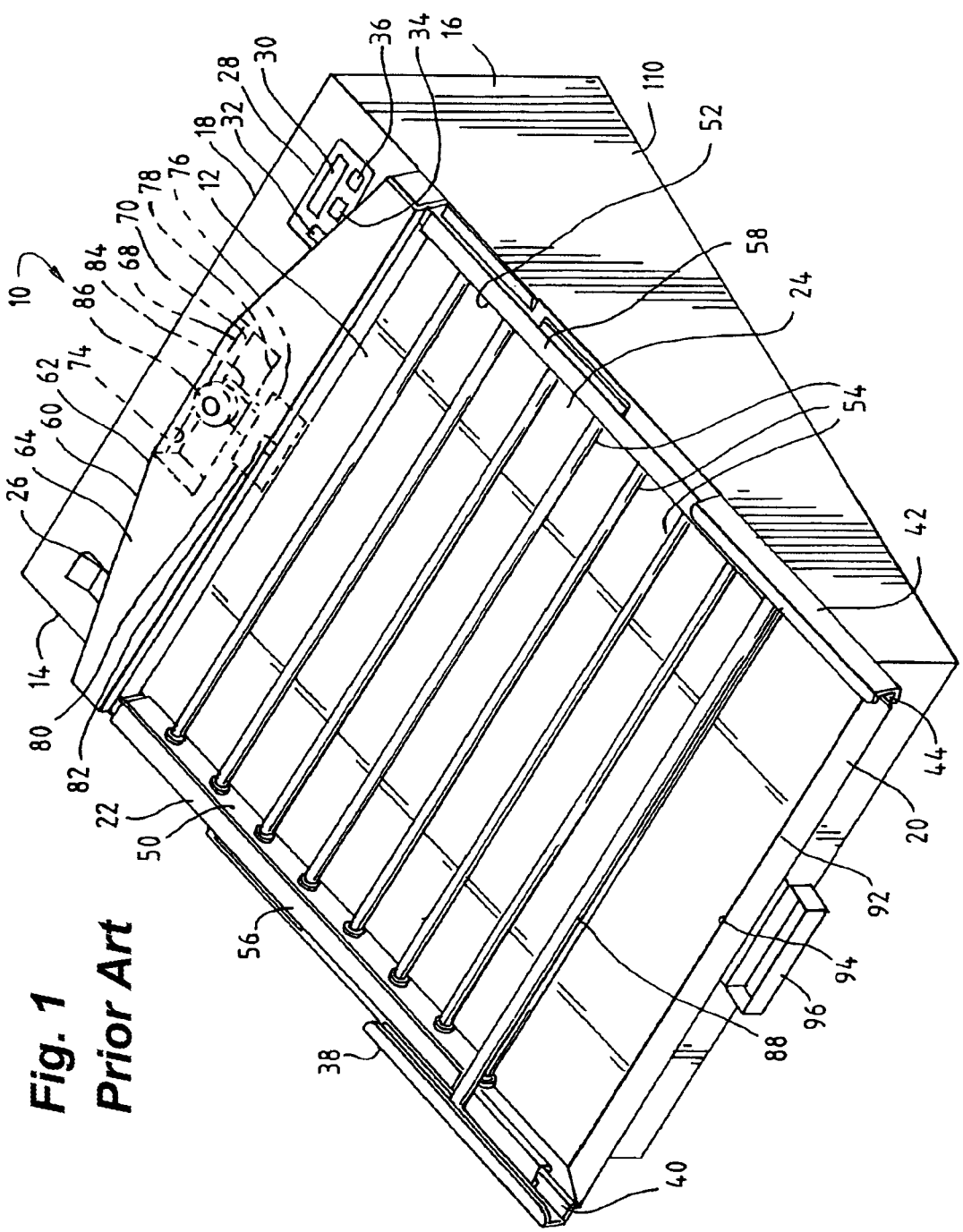
FIG. 1 is a top perspective view of a prior art hot dog grill.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIGS. 1-5 show perspective, top, bottom, front and side views of a hot dog grill 10 which incorporates an oscillation mechanism to oscillate a grill to rotate the hot dogs on a heating surface according to the present invention. The hot dog grill 10 is a stand alone unit which is used for the cooking of hot dogs or like foods such as sausage or bratwurst. The hot dog grill 10 has a frame assembly which includes an inclined top plate 12, a pair of side walls 14 and 16, a back wall 18 and a front wall 20. An oscillating grill assembly 22 is installed on the top plate 12. A cooking surface or heating surface 24 is defined on the top plate 12 under the oscillating grill assembly 22. The top plate 12 also has an on/off switch 26 and a heat control panel 28.

The on/off switch 26 turns on power to the grill 10. The heating surface 24 provides heat which cooks the hot dogs resting on it and held in place by to the oscillating grill assembly 22. The temperature of the heating surface 24 is controlled via the heat control panel 28. The heat control panel 28 has a digital readout 30, a set key 32, an up arrow key 34 and a down arrow key 36. The temperature of the heating surface 24 is displayed on the digital readout 30. The set key 32 allows a user to set a temperature which will be displayed on the digital readout 30 via the up and down arrow keys 34 and 36.

Figure 6A:
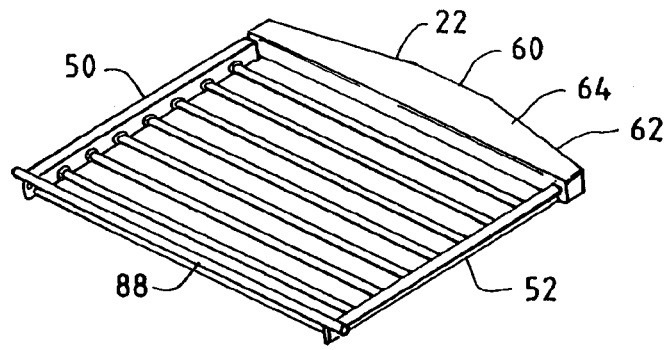
FIG. 6A is a perspective view of the grill assembly of the prior art hot dog grill of FIG. 1.
Figure 6B:
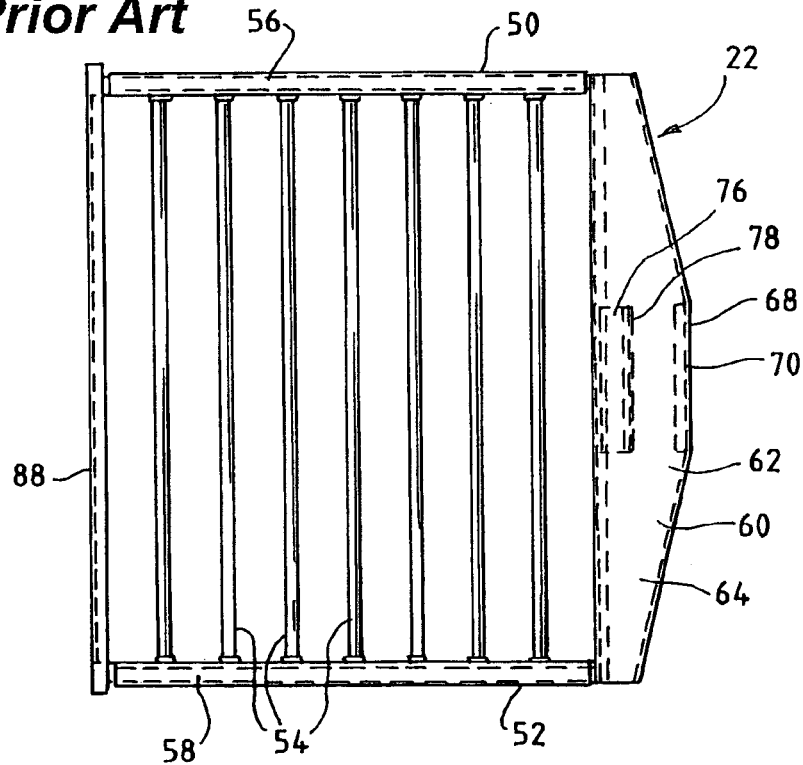
FIG. 6B is a top view of the grill assembly of the prior art hot dog grill of FIG. 1.
Figure 6C:
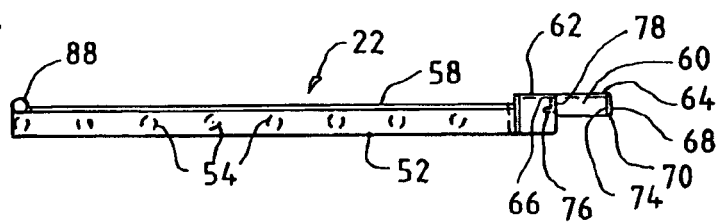
FIG. 6C is a side view of the grill assembly of the prior art hot dog grill of FIG. 1.

The top of the side wall 14 has a guide 38 with a slot 40 while the top of the side wall 16 has a parallel guide 42 with a slot 44. The grill assembly 22 is shown in greater detail in FIGS. 6A-6C and has a pair of side bars 50 and 52 which are parallel and have a series of lateral rods 54 extending between the side bars 50 and 52. The lateral rods 54 are spaced so hot dogs may be placed between the lateral rods 54 and rest on the heating surface 24. The hot dogs rest against one of the lateral rods 54 from the incline of the heating surface 24. The side bars 50 and 52 have a respective rail 56 and 58 which move within the slots 40 and 44 respectively. In this manner the grill assembly 22 may be oscillated back and forth on the inclined top plate 12 and guided by the rails 56 and 48 moving within the slots 40 and 44. Since the grill assembly 22 is also inclined, the oscillation motion rotates hot dogs which rest against the lateral rods 54 and thus are pushed by the rods 54 in order to insure uniform cooking.

The side bars 50 and 52 are also joined by a top frame member 60. The top frame member 60 has a trapezoidal plate 62 with a top surface 64 and a bottom surface 66. The bottom surface 66 has a front plate 68 with an extending horizontal plate 70 to form a front slot 74 and a rear block 76 with a back plate 78. A crank mechanism 80 is used to oscillate the grill assembly 22. The crank mechanism 80 is installed near the top frame member 60 of the grill assembly 22. The crank mechanism 80 has a vertical shaft 82 which extends from the inclined top plate 12 and has one end rotatably coupled to one end of a pivot block 84. The opposite end of the pivot block 84 has a circular cap 86 which fits between the front slot 74 and the back plate 78 of the top frame member 60. A lateral bar 88 also joins the side bars 50 and 52 opposite the top frame member 60.

The opposite end of the vertical shaft 82 is coupled to a motor 90 which rotates the shaft 82 which in turn rotates the pivot block 84 and moves the cap 86 in a circular motion. The circular motion of the cap 86 moves the grill assembly 22 in an up and down motion over the heating surface 24. The grill surface assembly 22 is guided by the rails 56 and 58 moving in the slots 40 and 44.

A catch wall 92 is attached to the end of the inclined top plate 12 to catch any oil or grease from the cooking process which will run down the top plate 12. A drain hole 94 is located at the end of the inclined top plate 12. A detachable grease container 96 with a tab 98 is hooked in a slot 100 on the front wall 20. Grease which is drained through the drain hole 94 thus may be collected in the grease container 96. The back wall 18 has a pair of vents 102 and 104 with a number of slits which provide venting for the electronic components.

Figure 5:
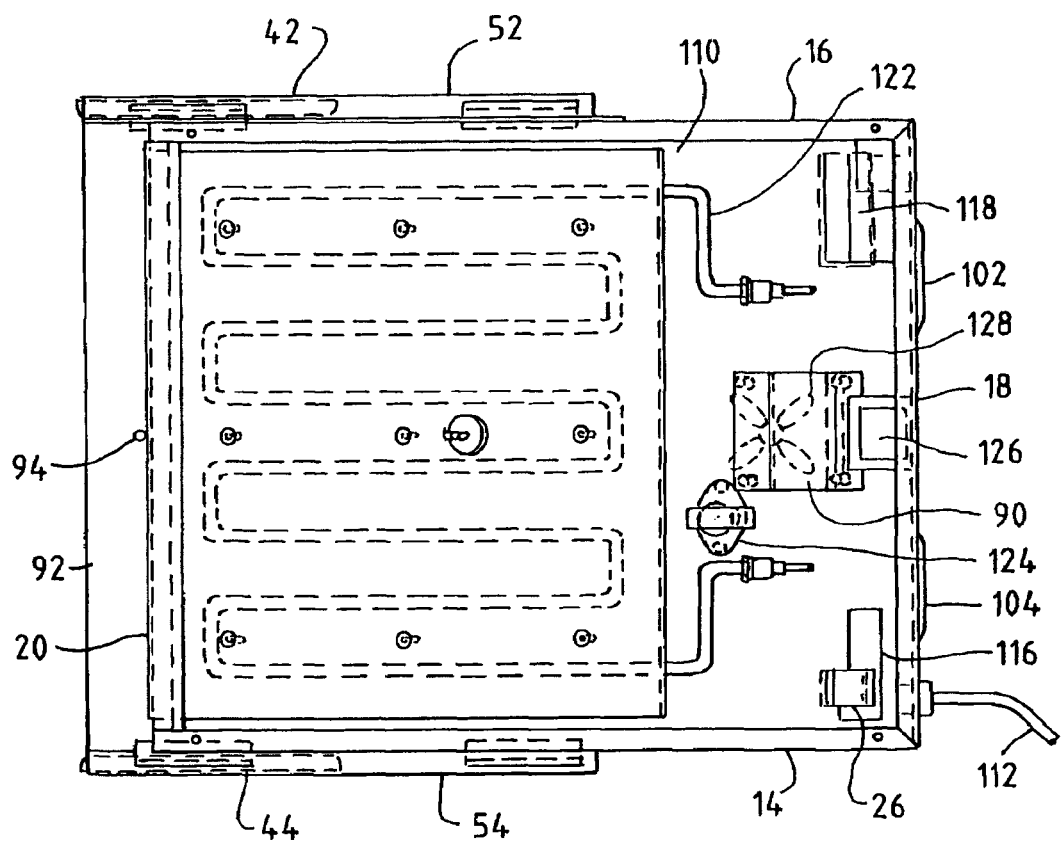
FIG. 5 is a bottom view of the prior art hot dog grill of FIG. 1 with the back panel removed.
Figure 7:
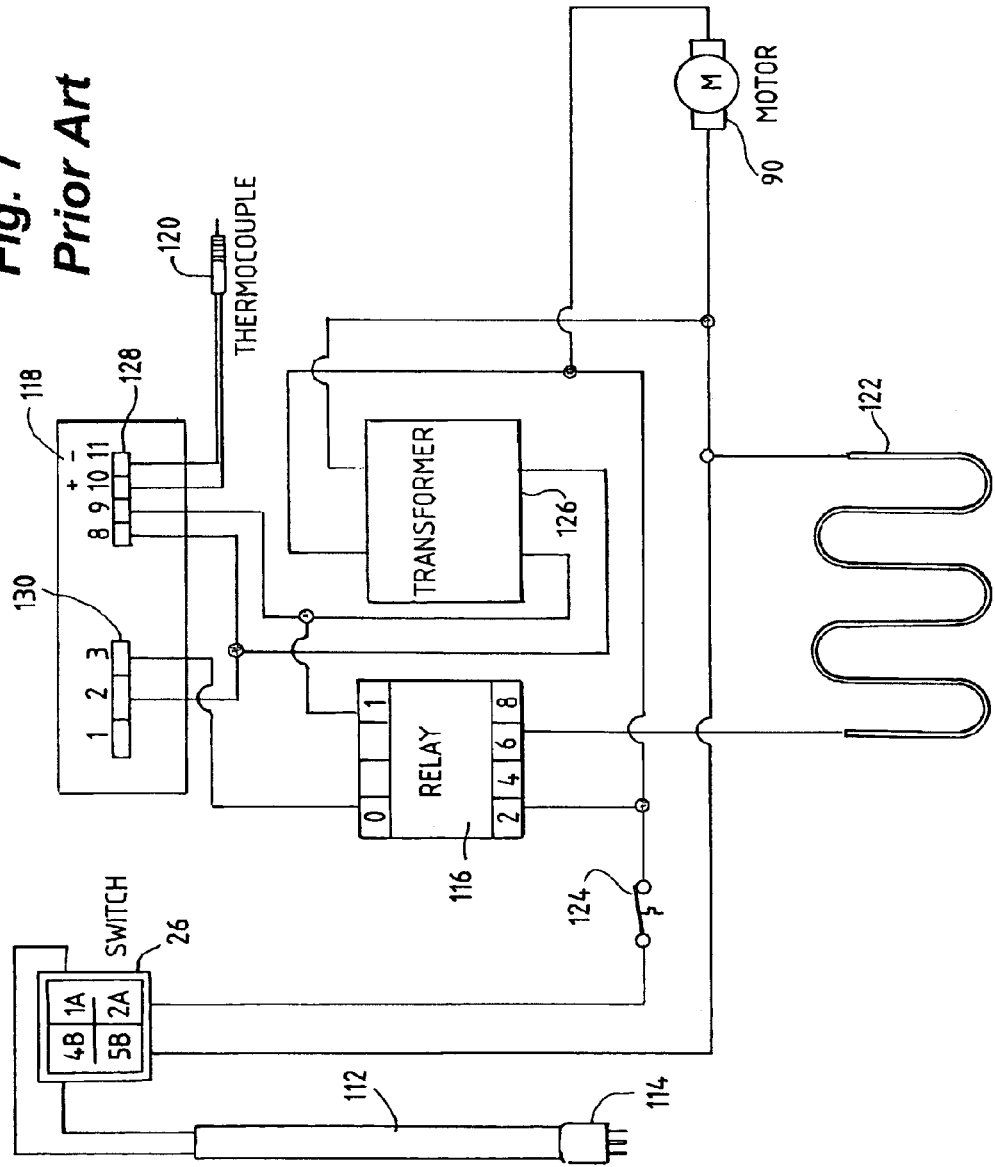
FIG. 7 is a circuit diagram of the electrical elements of the prior art hot dog grill of FIG. 1.

With reference to FIG. 5 and FIG. 7, the electrical components which are housed by the side, back and front walls 14, 16, 18 and 20 are shown. A back plate 110 is normally bolted on the underside of the walls 14, 16, 18 and 20 to protect the electrical components. A power cord 112 has a normal AC plug 114 on one end. The opposite end of the power cord 112 is coupled to the on/off switch 26 which is in turn coupled to a 24 volt relay 116. The relay 116 is controlled by a temperature controller 118. In this example, the temperature controller 118 is a Model FK400AJ3V001P106 manufactured by Quantem Corp., although other types of controllers or circuits such as a thermostat which control power based on temperature may be used. The temperature controller 118 includes digital components which are controlled by the control panel 28. The temperature controller 118 has a thermal input which is coupled to a type J thermocouple 120 which is coupled to the heating surface 24 to sense the temperature of the heating surface 24.

The relay 116 also supplies power to a heating element 122 which is 1000 Watt tubular element manufactured by Accutherm. The heating element 122 is mounted to the underside of the heating surface 24 and is powered to the temperature set by the user from the control panel 28. A temperature sensor such as a high limit thermo disc 124 which is preferably a White Rodgers, manual reset type control is coupled between the switch 26 and the heating element 122 via the relay 116. The thermo disc 124 is in contact with the heating surface 24 and is opened at a fixed temperature to cut off power to all electrical components. The fixed temperature is determined to prevent overheating or overload of the electrical components. Of course other electronic components may be used instead of the thermo disc 124 and other circuits may be used for the power cut off.

A 24 volt transformer 126 is coupled to the relay 116 and provides power to the motor 90 and the temperature controller 118. The motor 90 has a fan 128 which is coupled to the other end of the vertical shaft 82 to provide for additional air circulation through the vents 102 and 104.

FIG. 7 is an electrical diagram of the electrical components of the grill 10. The power cord 112 supplies power to the switch 26. The switch 26 in the on position allows power to flow to the relay 116. The relay 116 provides power to the heating element 122 and the motor 90. The motor 90 and the heating element 122 are wired in series with the high limit thermo disc 124 which will open at the fixed temperature thus shutting off power to the motor 90 and the heating element 122 if the fixed temperature is exceeded indicating a dangerous situation. The high limit thermo disc 124 may only be manually reset if opened.

The relay 116 also couples the power to the transformer 126 which converts the AC voltage to a 24 volt DC voltage. The output of the transformer 126 thus powers the temperature controller 118 as well as the relay 116. The temperature controller 118 has a temperature input 128 which is coupled to the thermocouple 120. The temperature controller 118 also has an output 130 which is coupled to the relay 116. The temperature controller 118 is programmed to sense the temperature of the heating surface 24 via the thermocouple 120. When the thermocouple 120 senses the programmed temperature at the heating surface 24, the controller 118 sends a signal from the output 130 to shut off the relay 116 and thus power to the heating element 122. When the heating surface 24 cools below a certain point the temperature controller 118 sends a signal to the relay 116 to close and allow power to flow to the heating element 122. The temperature controller 118 tries to hold the heating surface 24 at a constant temperature. The motor 90 continues to run regardless of whether power is supplied to the heating surface 24.

The motor 90 rotates the pivot block 84 and the cap 86 which in turn oscillates the grill assembly 22 over the heating surface 24. Since the motor 90 is mounted in a vertical position relative to the inclined plate 12 and at the center top position of the grill assembly 22, there is no need for mechanical linkages to other parts of the grill assembly 22. The oscillation motion of the grill assembly 22 in combination with gravity due to the inclined orientation allow the rods 54 to push the hot dogs up and down on the heating surface 24 causing rotation and resulting in even heat application.

In addition to the embodiments described above, a variety of other suitable structural, mechanical and/or electrical systems can be used to move the grill assembly 22 up and down over the heating surface 24 in accordance with the present disclosure. FIGS. 8-10C, for example, illustrate several embodiments configured in accordance with the present disclosure that can move the grill assembly 22 through various linkages, cams, and/or other components. Although these embodiments describe several additional mechanisms having various components, it is within the scope of the present disclosure to provide combinations of the components of these and other embodiments, and/or to provide other features that move the grill assembly 22.

Figure 8:
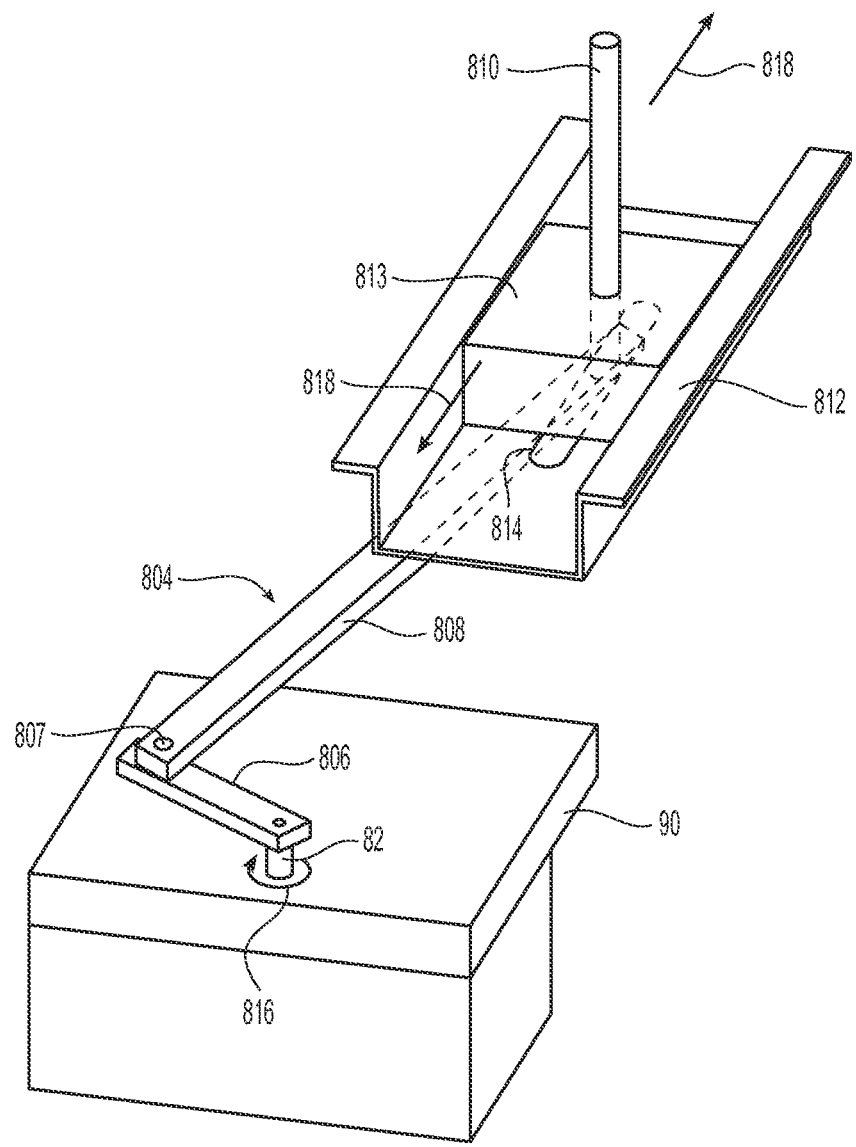
FIG. 8 is an isometric view of a motor and a linkage configured in accordance with an embodiment of the present disclosure.

FIG. 8 is an isometric view of the motor 90 and a linkage 804 configured in accordance with an embodiment of the present disclosure. In the illustrated embodiment, the motor 90 is operably coupled to the linkage 804 by a rotatable vertical shaft 82. The linkage 804 includes a first arm 806 operably coupled to a second arm 808 by a pivot 807. A connecting rod 810 is fixedly attached to a distal end portion of the second arm 808. The connecting rod 810 extends upwardly through a channel 814 of a guide member 812 and through a guide block 813 that is slidably coupled to the guide member 812. The motor 90 and the guide member 812 can be operably mounted within the hot dog grill 10 (see, e.g., FIGS. 1 and 2) with the connecting rod 810 extending through the heating surface 24. The heating surface 24 can include a slot (not shown) that aligns with the channel 814, and the connecting rod 810 can operably attach to the grill assembly 22.

In operation, the motor 90 rotates the vertical shaft 82 in the direction of arrow 816. The linkage 804 translates the rotation of the vertical shaft 82 into reciprocating linear motion of the connecting rod 810 within the channel 814. The connecting rod 810 and the attached grill assembly 22 (not shown in FIG. 8) move back and forth in the direction of the arrows 818. The grill assembly 22 thereby moves over the heating surface 24 in a manner at least generally similar to that described above with respect to FIGS. 1-6C.

Figure 2:
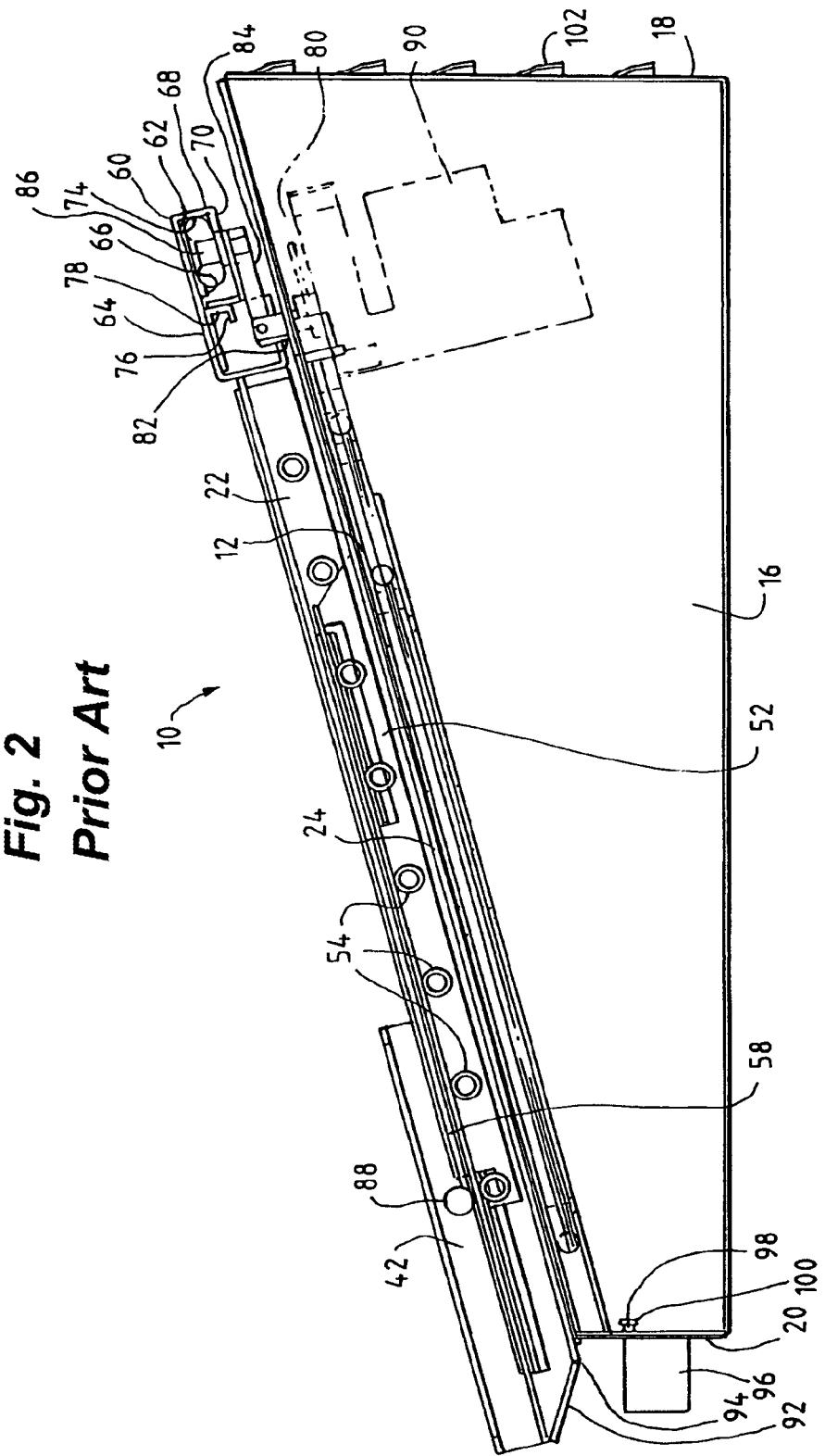
FIG. 2 is a side view of the prior art hot dog grill of FIG. 1.
Figure 3:
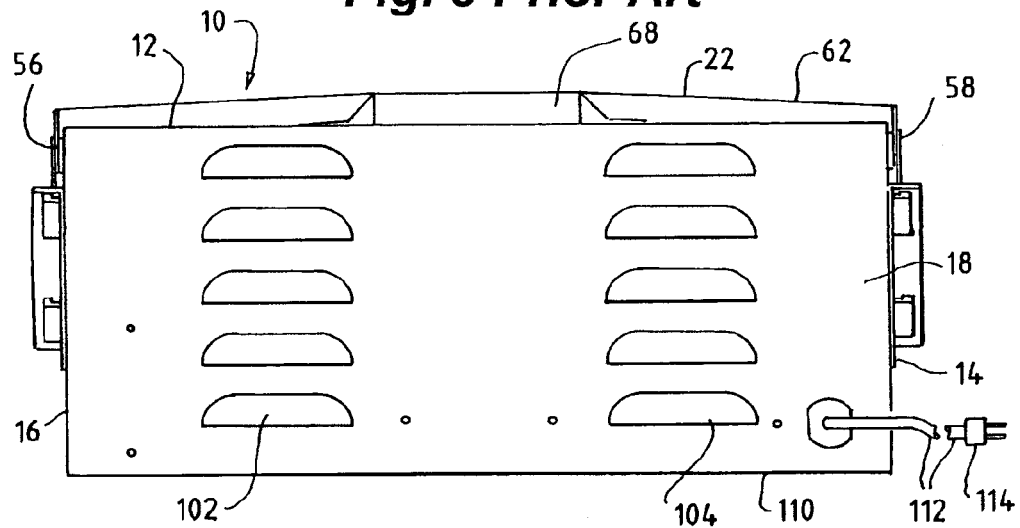
FIG. 3 is a back view of the prior art hot dog grill of FIG. 1.
Figure 4:
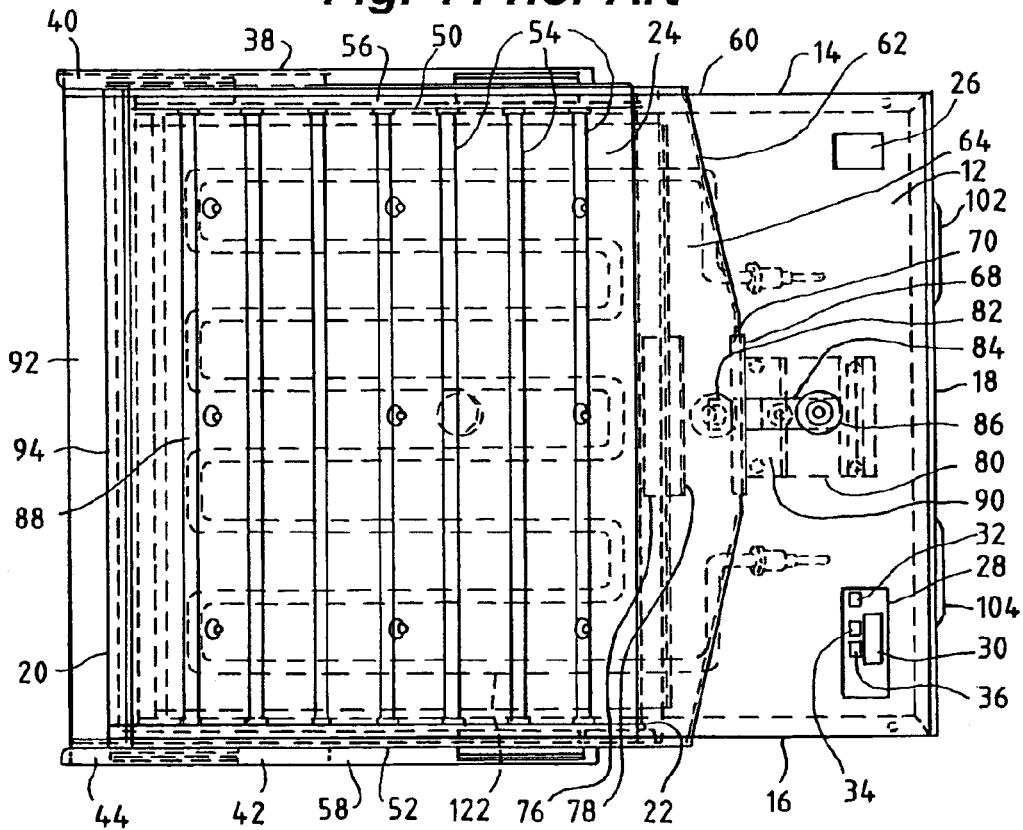
FIG. 4 is a top view of the prior art hot dog grill of FIG. 1.
Figure 9A:
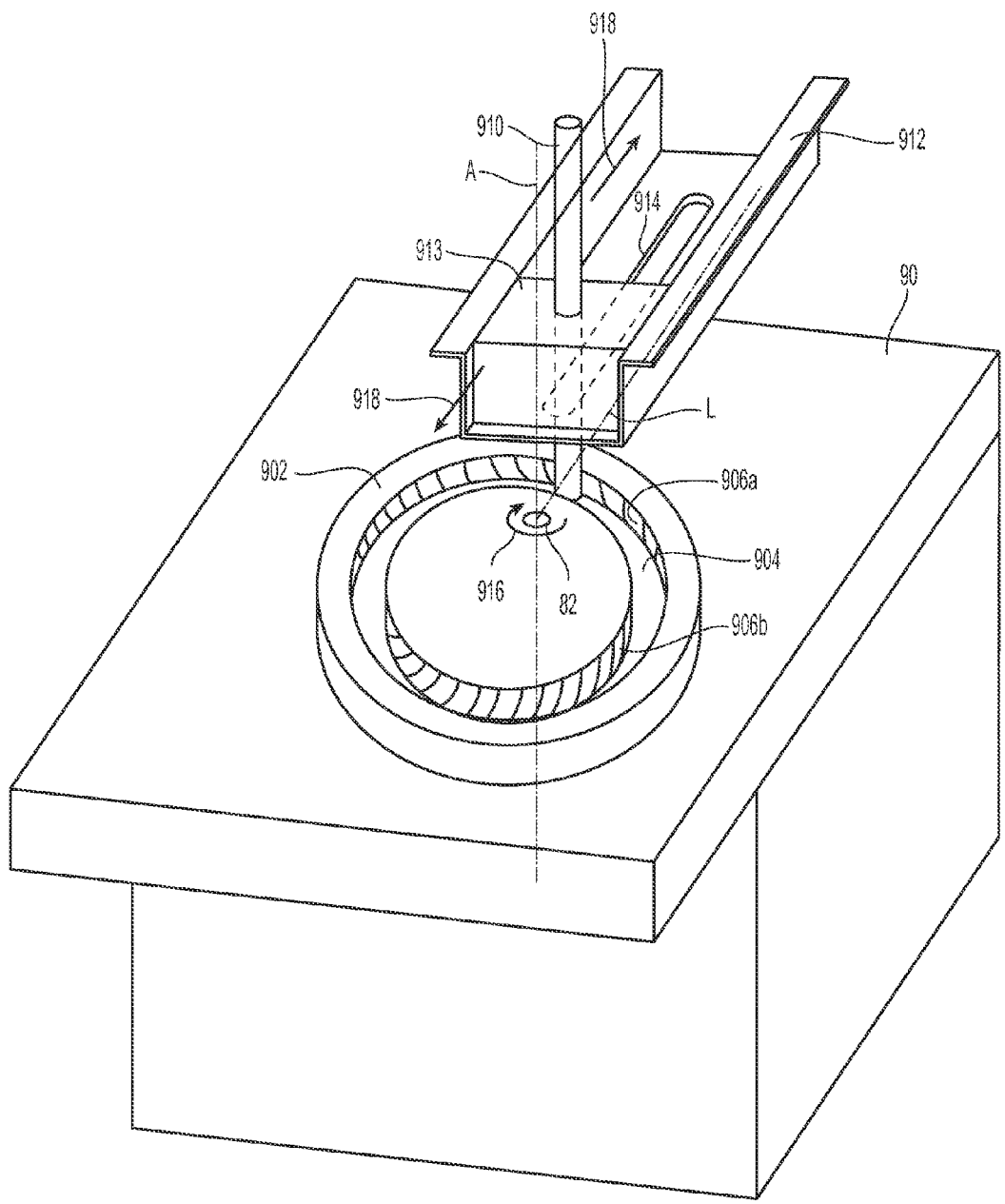
FIG. 9A is an isometric view of a motor and a cam configured in accordance with an embodiment of the present disclosure.

FIG. 9A is an isometric view of an off-centered cam 902 having a groove 904 configured in accordance with another embodiment of the present disclosure. In the illustrated embodiment, the cam 902 is operably coupled to the vertical shaft 82 at an off-centered position (e.g., at a position that is not coaxial with the center of the cam 902), and a first end portion of a connecting rod 910 is movably disposed in the groove 904. The groove 904 is defined by an interior wall 906a and an exterior wall 906b (identified collectively as the walls 906). Although the cam 902 and the groove 904 of the illustrated embodiment have circular shapes, cams and grooves in accordance with the present technology can have other shapes, including oblong, oval, and/or other suitable shapes. The motor 90 can be mounted within the hot dog grill 10 (see, e.g., FIGS. 1 and 2) below the heating surface 24. A guide track or guide member 912 having a channel 914 can be mounted proximate the motor 90. A guide block 913 can be slidably coupled to the guide member 912 and the connecting rod 910 can extend from the groove 904 through the channel 914 and through the guide block 913. In a manner generally similar to that described above with respect to FIG. 8, the channel 914 can align with a slot (not shown) in the heating surface 24 (FIGS. 1 and 2). The connecting rod 910 extends through the slot and a second end portion of the connecting rod 910 is operably coupled to the grill assembly 22. The slot, the channel 914, the guide block 913 and the groove 904 can maintain the connecting rod 904 in a generally vertical alignment.

In operation, the motor 90 rotates the vertical shaft 82 and the cam 902 in the direction of arrow 916 about an axis A. The corresponding rotation of the off-centered cam 902 and the groove 904 around the axis A drives the connecting rod 910 back and forth in the channel 914 along the line L. As the connecting rod 910 moves back and forth along the line L in the direction of arrows 918, the grill assembly 22 moves up and down over the heating surface 24.

Figure 9B:
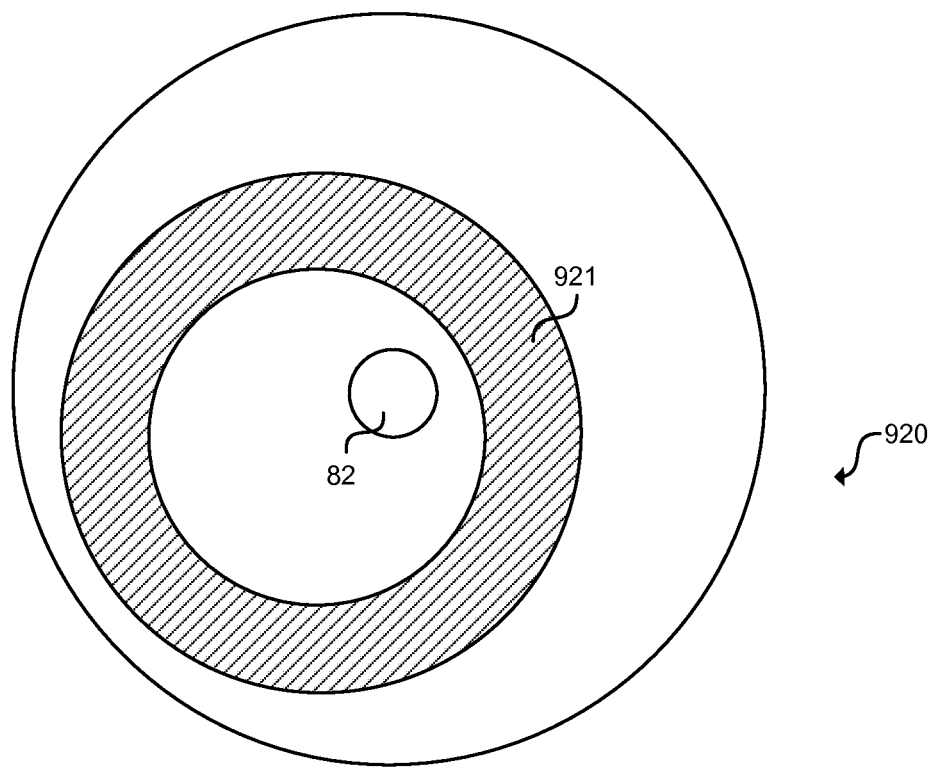
FIG. 9B is an overhead view of a cam configured in accordance with an embodiment of the disclosure.

Although the illustrated embodiment of FIG. 9A includes the off-centered cam 902 that drives the back and forth motion of the connecting rod 910, cams in accordance with the present technology can be configured in a variety of suitable manners to provide back and forth motion of the connecting rod 910. For example, FIG. 9B is an overhead view of a cam 920 having an eccentric groove 921. The cam 920 is coaxially coupled to the vertical shaft 82, and can be positioned in relation to the components of a hot dog grill in a manner at least generally similar to that of the cam 902 in FIG. 9A. Accordingly, rotation of the eccentric groove 921 can drive the back and forth motion of the connecting rod 910. Additionally, similar to the cam 902, although the illustrated embodiment of FIG. 9B includes a circular cam 920 with a circular eccentric groove 921, in several embodiments, the cam 920 and/or the groove 921 can have other suitable shapes (e.g., oblong, oval, etc.).

Figure 10A:
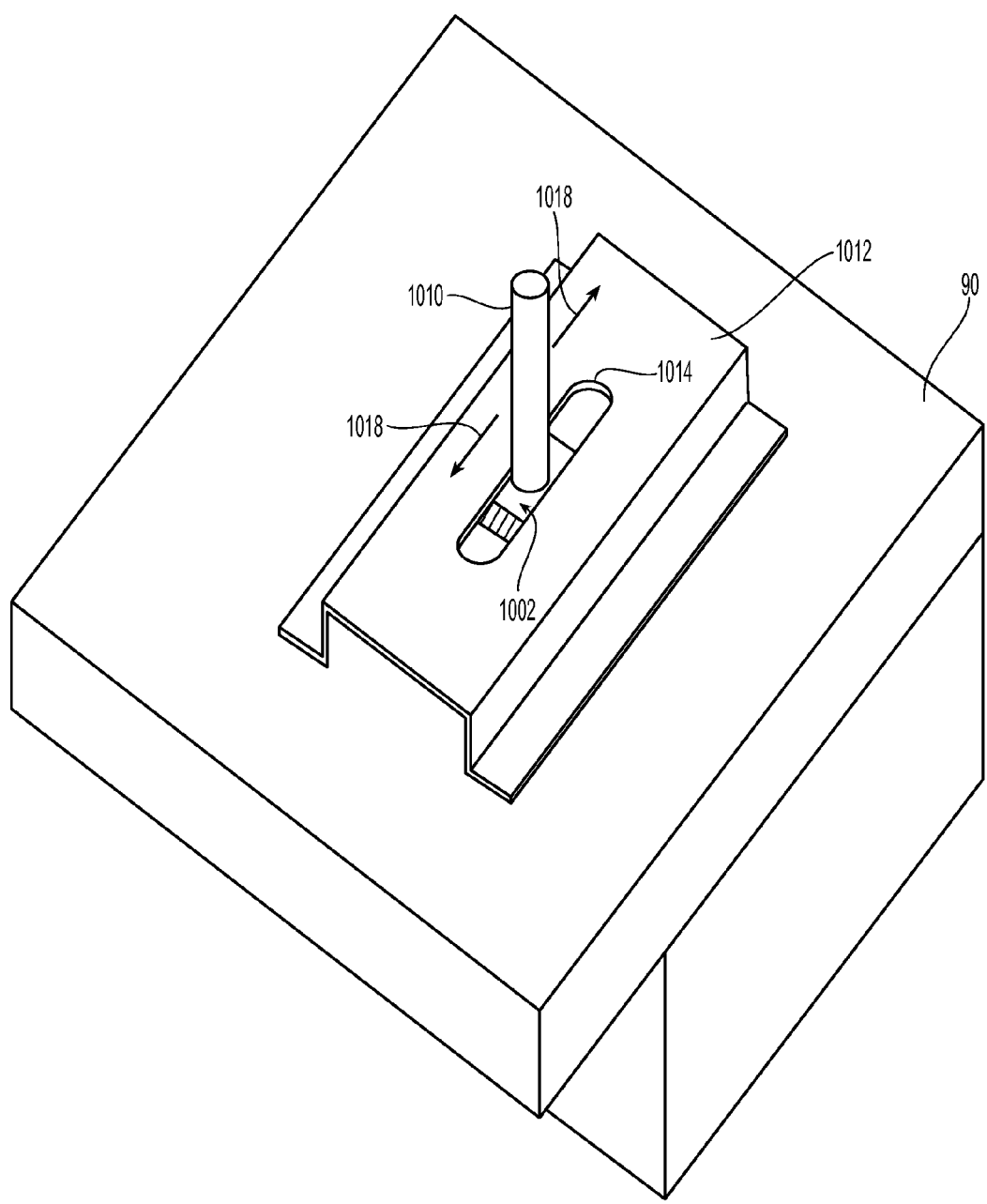
FIG. 10A is an overhead isometric view of a sliding assembly configured in accordance with another embodiment of the present disclosure.
Figure 10B:
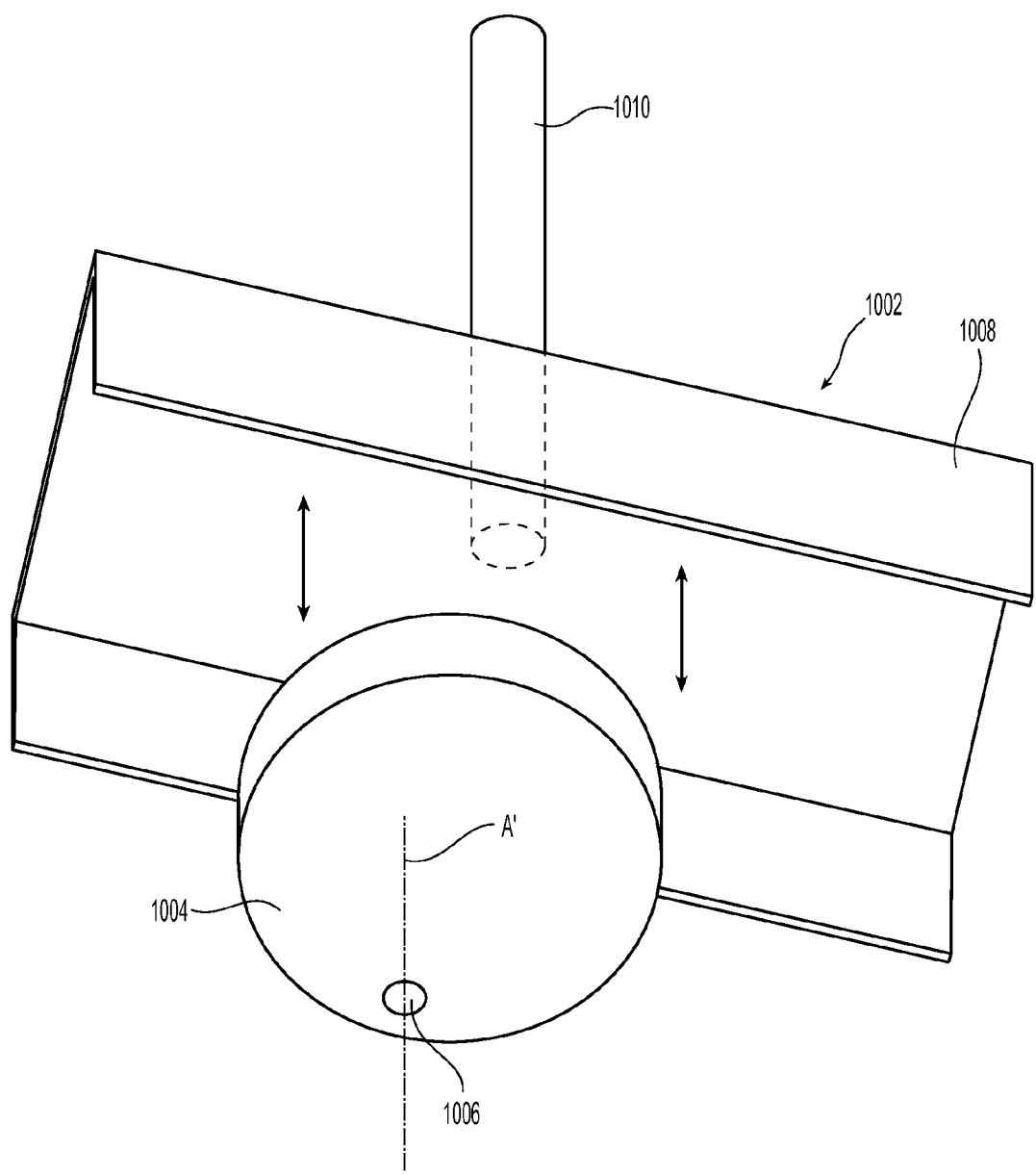
FIG. 10B is an exploded bottom isometric view of a cam and a translating member of the sliding assembly of FIG. 10A.
Figure 10C:
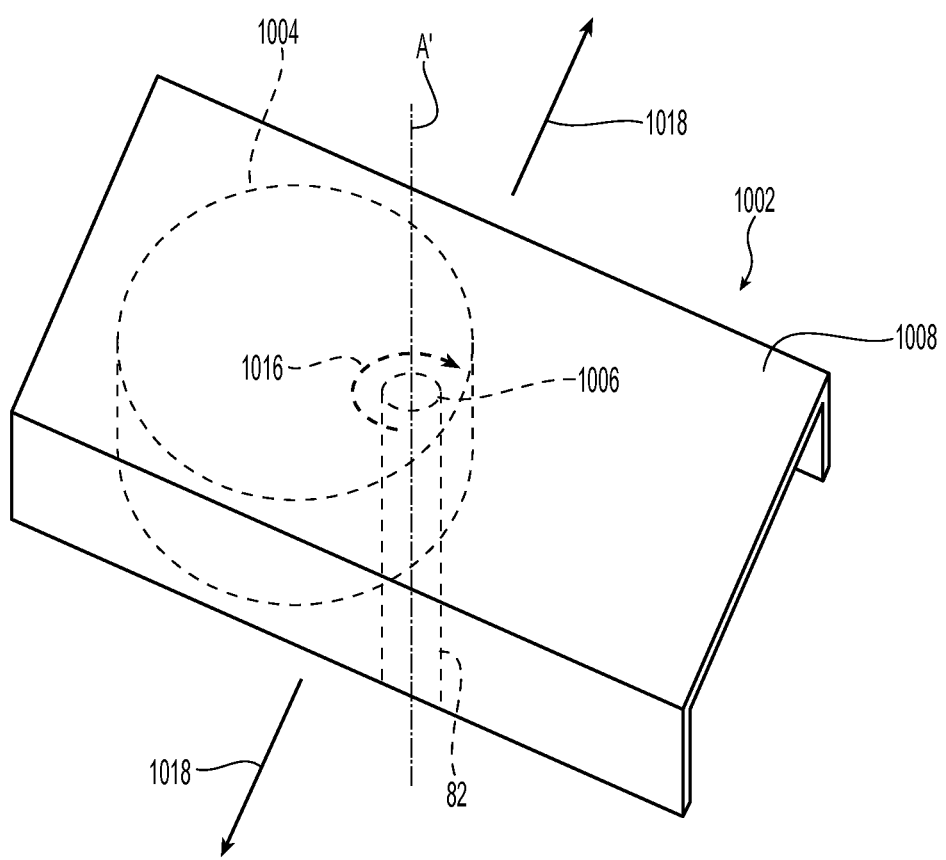
FIG. 10C is an isometric view of the cam and the sliding assembly of FIG. 10B.

FIGS. 10A-10C illustrate several isometric views of a sliding assembly 1002 and associated components configured in accordance with a further embodiment of the present disclosure. FIG. 10A is an overhead isometric view of the sliding assembly 1002 positioned within a guide track or guide member 1012 having a channel 1014. The guide member 1012 can be fixedly attached to the motor 90 to guide the sliding assembly 1002. A connecting rod 1010 is fixedly attached to the sliding assembly 1002 and extends upwardly through the channel 1014. FIG. 10B is an exploded bottom isometric view of the sliding assembly 1002. Referring to FIGS. 10A and 10B together, in the illustrated embodiment, the sliding assembly 1002 includes a translating block or translating member 1008 operably coupled to a cam 1004 having an off-centered rotational axis A'. The cam 1004 can be positioned within the translating member 1008, and rotation of the cam 1004 can oscillate the grill assembly 22, as further described below.

FIG. 10C is an overhead isometric view of the cam 1004 and the sliding assembly 1002 of FIG. 10B. In the illustrated embodiment, the vertical shaft 82 of the motor 90 (not shown in FIG. 10C) is operably coupled to the cam 1002 via an opening 1006 aligned with the axis A'. Referring to FIGS. 10A-10C together, the motor 90, the sliding assembly 1002 and the guide member 1012 can be mounted in the hot dog grill 10 (FIGS. 1 and 2). The connecting rod 1010 can extend through a slot in the heating surface 24 and attach to the grill assembly 22 in a manner generally similar to that described above with respect to the connecting rods 810 and 910 of FIGS. 8 and 9. In operation, the motor 90 rotates the vertical shaft 82 and the attached cam 1002 in the direction of arrow 1016. Rotation of the cam 1004 about the off-centered axis A' moves the cam 1004 in a circular path, moving the translating member 1008 and the attached connecting rod 1010 back and forth in the direction of arrows 1018. The connecting rod 1010 moves the attached grill assembly 22 along the heating surface 24 (FIGS. 1 and 2).

Hot dog grills configured in accordance with the present disclosure can include several components or features that are generally similar in structure and/or function to those described in U.S. Pat. No. 7,658,143, and titled "OSCILLATING HOT DOG GRILL," the entirety of which is incorporated herein by reference.

It will be apparent to those skilled in the art that various modifications and variations can be made in the method and system of the present invention without departing from the spirit or scope of the invention. For example, hot dog grills configured in accordance with the present disclosure can include solenoids, hydraulics, and/or other components that provide motion to a grill assembly and/or provide other functions. Thus, the present invention is not limited by the foregoing descriptions but is intended to cover all modifications and variations that come within the scope of the spirit of the invention and the claims that follow.

I claim:

1. A hot dog grill for cooking hot dogs, the hot dog grill comprising:
   a plate having a heating surface;
   a grill assembly positioned proximate to the plate and moveable relative to the plate;
   a motor;
   a cam operably coupled to the motor and having a groove; and
   a connecting rod having a first end portion movably received in the groove and a second end portion operably coupled to the grill assembly, wherein operation of the motor rotates the cam and drives the connecting rod to move the grill assembly back and forth along the heating surface.

2. The hot dog grill of claim 1, further comprising:
   a guide track positioned proximate to the motor and having a channel; and
   a guide block slidably coupled to the guide track, wherein the connecting rod extends through the channel and through the guide block, and wherein the guide block and the groove maintain alignment of the connecting rod.

3. The hot dog grill of claim 1 wherein the groove is eccentric, and wherein rotation of the cam drives the connecting rod via the eccentric groove.

4. The hot dog grill of claim 1, further comprising a shaft, and wherein the cam is an off-centered cam that is operably coupled to the shaft at an off-centered position.

5. The hot dog grill of claim 1, further comprising a guide block, wherein the connecting rod extends through the guide block, and wherein the guide block maintains alignment of the connecting rod.

6. The hot dog grill of claim 1, further comprising a guide track having a channel, and wherein movement of the grill assembly back and forth along the heating surface includes movement of the connecting rod back and forth through the channel.

7. A hot dog grill for cooking hot dogs, the hot dog grill comprising:
   a plate having a cooking surface;
   a grill assembly positioned on the plate and oscillatable along the plate;
   a motor; and
   a cam operably coupled to the motor, wherein the cam includes an off-centered rotational axis, and wherein operation of the motor rotates the cam to oscillate the grill assembly back and forth along the plate.

8. The hot dog grill of claim 7, further comprising:
   a translating block operably coupled to the cam;
   a connecting rod fixedly attached to the translating block and operably coupled to the grill assembly; and
   a guide track having a channel, wherein the translating block is positioned within the guide track, and wherein the connecting rod extends through the channel.

9. The hot dog grill of claim 7, further comprising:
   a translating block, wherein the cam is positioned within the translating block; and
   a guide track, wherein the translating block is positioned within the guide track, and wherein rotation of the cam moves the translating block back and forth within the guide track.

10. The hot dog grill of claim 9 wherein the guide track includes a channel, and wherein the connecting rod extends through the channel.

11. The hot dog grill of claim 7 wherein the cam has a circular shape.

12. The hot dog grill of claim 7, further comprising means for heating the cooking surface.

13. A method for cooking hot dogs, the method comprising:
   rotating a cam about an off-centered axis to move a connecting rod within a groove in the cam;
   oscillating a grill assembly along a cooking surface via the rotating cam; and
   heating the cooking surface.

14. The method of claim 13 wherein oscillating a grill assembly along a cooking surface via the rotating cam includes moving a translating block back and forth within a guide track.

15. The method of claim 13 wherein oscillating a grill assembly along a cooking surface via the rotating cam includes moving the connecting rod within a channel of a guide track.

16. A method for cooking hot dogs, the method comprising:
- rotating a cam;
- oscillating a grill assembly along a cooking surface via the rotating cam, wherein oscillating a grill assembly along a cooking surface via the rotating cam includes moving a connecting rod within an eccentric groove in the cam; and
- heating the cooking surface.

17. The method of claim 16, further comprising moving a guide block within a guide track to maintain alignment of the connecting rod.

\* \* \* \* \*